(12) United States Patent
Pan

(10) Patent No.: US 9,109,731 B2
(45) Date of Patent: Aug. 18, 2015

(54) SYSTEM AND METHOD FOR CONVEYING SOLIDS THROUGH AN OUTLET PIPE

(71) Applicant: General Electric Company, Schenectady, NY (US)

(72) Inventor: Edward Chen Pan, Houston, TX (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 13/685,637

(22) Filed: Nov. 26, 2012

(65) Prior Publication Data

US 2014/0144511 A1 May 29, 2014

(51) Int. Cl.
*B65G 53/42* (2006.01)
*F16L 27/12* (2006.01)

(52) U.S. Cl.
CPC ..................................... *F16L 27/12* (2013.01)

(58) Field of Classification Search
USPC ............... 406/71, 191; 198/642, 723; 415/90, 415/206, 224.5
See application file for complete search history.

(56) References Cited

U.S. PATENT DOCUMENTS

| | | | |
|---|---|---|---|
| 3,689,119 A * | 9/1972 | Weichel et al. ............... | 406/162 |
| 3,730,228 A | 5/1973 | Gibbs, Sr. | |
| 3,767,031 A * | 10/1973 | Gorgei et al. ................. | 198/497 |
| 4,028,009 A | 6/1977 | Gudzenko et al. | |
| 4,047,604 A * | 9/1977 | Daoust et al. ................... | 193/10 |
| 4,047,901 A * | 9/1977 | Baron et al. ................... | 48/86 R |
| 4,133,347 A | 1/1979 | Mercer | |
| 4,194,615 A * | 3/1980 | Tell et al. ...................... | 198/524 |
| 4,223,702 A | 9/1980 | Cook | |
| 4,232,632 A * | 11/1980 | Kice ............................... | 119/844 |
| 4,366,900 A * | 1/1983 | Johansson ..................... | 198/817 |
| 4,512,687 A * | 4/1985 | Enns ................................ | 406/41 |
| 4,711,334 A * | 12/1987 | Barry et al. ....................... | 193/6 |
| 4,721,425 A * | 1/1988 | Strocker ........................ | 414/298 |
| 4,949,835 A * | 8/1990 | Beeman et al. ............. | 198/464.4 |
| 5,226,775 A * | 7/1993 | Bohle ............................ | 414/295 |
| 5,323,813 A | 6/1994 | Barrett | |
| 5,487,229 A * | 1/1996 | Nathenson et al. ............. | 37/347 |
| 5,542,790 A * | 8/1996 | Stuller et al. .................. | 406/116 |
| 5,738,148 A * | 4/1998 | Coral et al. .................... | 138/120 |
| 5,875,882 A * | 3/1999 | Pollock .......................... | 198/674 |
| 6,071,424 A | 6/2000 | Tuszko et al. | |
| 6,186,304 B1 * | 2/2001 | H.ang.kansson ................. | 193/6 |
| 6,499,929 B1 * | 12/2002 | Salgado et al. ............... | 414/299 |
| 6,596,170 B2 | 7/2003 | Tuszko et al. | |
| 6,743,401 B2 | 6/2004 | Guerra | |
| 7,303,062 B2 * | 12/2007 | Baer et al. ..................... | 198/642 |
| 8,398,469 B2 * | 3/2013 | Coers et al. ................... | 460/114 |
| 8,882,400 B2 * | 11/2014 | Leininger ........................ | 406/71 |
| 2001/0030107 A1 * | 10/2001 | Simpson ........................ | 198/670 |
| 2005/0155916 A1 | 7/2005 | Tuszko et al. | |

* cited by examiner

*Primary Examiner* — Joseph Dillon, Jr.
(74) *Attorney, Agent, or Firm* — Fletcher Yoder, P.C.

(57) ABSTRACT

A system includes a solids pressurizing feeder and an outlet pipe coupled to an outlet channel of the solids pressurizing feeder. The outlet pipe includes a plurality of pipe segments telescopically coupled to one another such that a length of the outlet pipe is adjustable. The solids pressurizing feeder may be used to convey a mixture of solids and fluids.

13 Claims, 3 Drawing Sheets

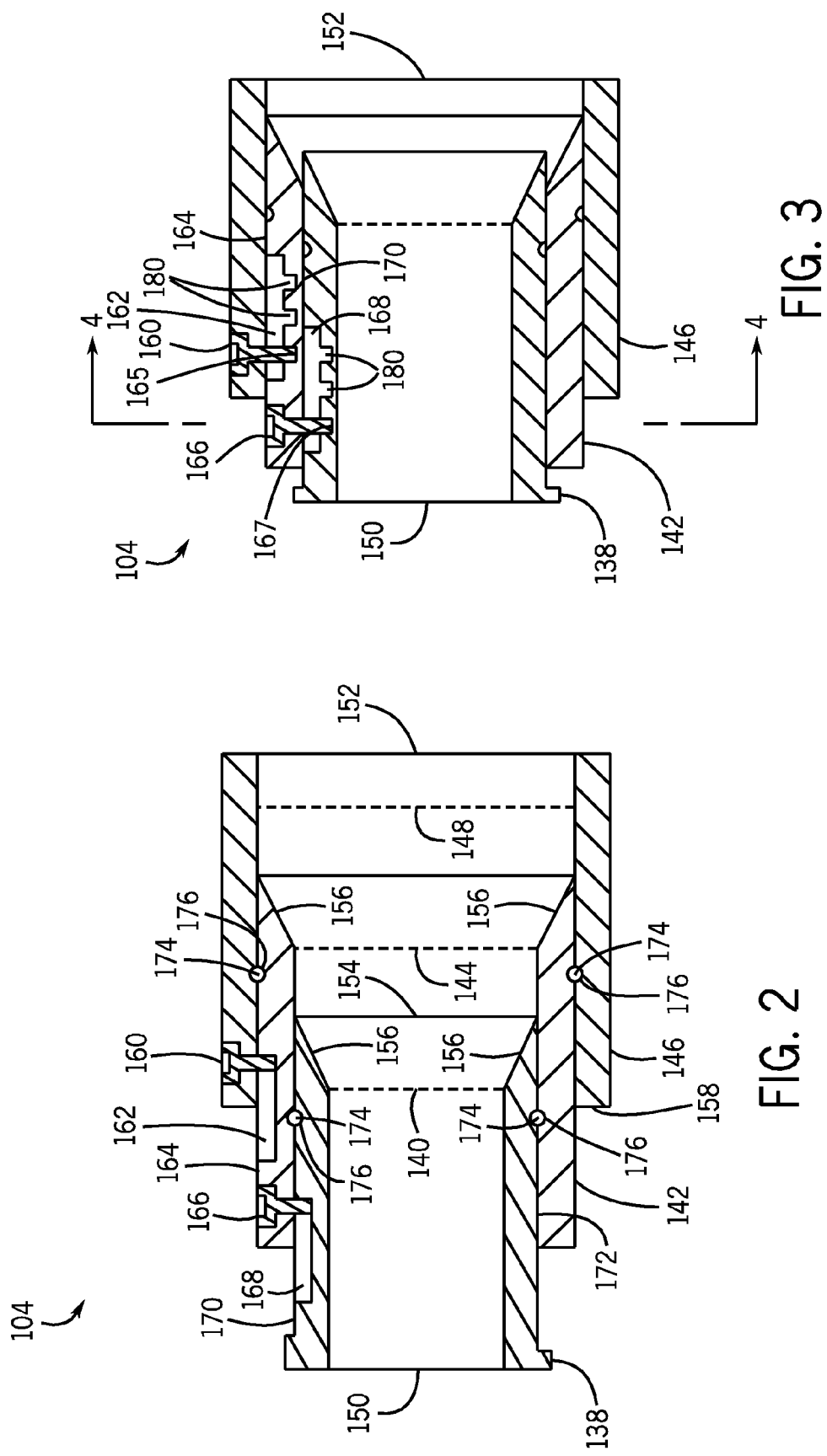

SYSTEM AND METHOD FOR CONVEYING SOLIDS THROUGH AN OUTLET PIPE

BACKGROUND OF THE INVENTION

The subject matter disclosed herein relates to conveying solids through an outlet pipe, and, more particularly, to conveying solids through an outlet pipe of a pump.

Various industrial processes include the conveying of solids in the presence of fluids, which may be gases or liquids. For example, a coal and biomass mixture may be conveyed through a solids pressurizing feeder in an integrated gasification combined cycle (IGCC) power plant. In systems such as these, the amount of force to convey the solids mixture through the system varies depending on the chemical compositions, moisture content, compressibility, and other variables of the solids mixture. Thus, system components that contribute to the overall force needed by the system to drive the solids mixture might often need to be changed or replaced when a different amount of overall force is needed by the system. Replacing these system components may be difficult, and it may be inefficient and costly to frequently replace such system components.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a solids pressurizing feeder and an outlet pipe coupled to an outlet channel of the solids pressurizing feeder. The outlet pipe includes a plurality of pipe segments telescopically coupled to one another such that a length of the outlet pipe is adjustable.

In a second embodiment, a system includes a pump outlet pipe having a plurality of pipe segments telescopically coupled to one another such that a length of the outlet pipe is adjustable. The pump outlet pipe further includes a plurality of securing devices coupled to the plurality of pipe segments, and configured to secure each of the plurality of pipe segments with respect to one another. The pump outlet pipe further includes an O-ring disposed between each of the plurality of pipe segments and configured to block a flow of fluid between each of the plurality of pipe segments.

In a third embodiment, a method includes operating a solids pressurizing feeder having an outlet pipe coupled to an outlet channel of a solids pressurizing feeder. The outlet pipe includes a plurality of pipe segments telescopically coupled to one another. The method further includes adjusting a length of the outlet pipe to a first length, and operating the solids pressurizing feeder with the outlet pipe at the first length. The method further includes adjusting the length of the outlet pipe to a second length and operating the solids pressurizing feeder with the outlet pipe at the second length. The second length is different from the first length.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is an axial cross-sectional view of an embodiment of an expanded pipe outlet having a plurality of telescopic pipe segments;

FIG. 3 is an axial cross-sectional view of an embodiment of a compressed pipe outlet having a plurality of telescopic pipe segments;

DETAILED DESCRIPTION OF THE INVENTION

Figure 1:
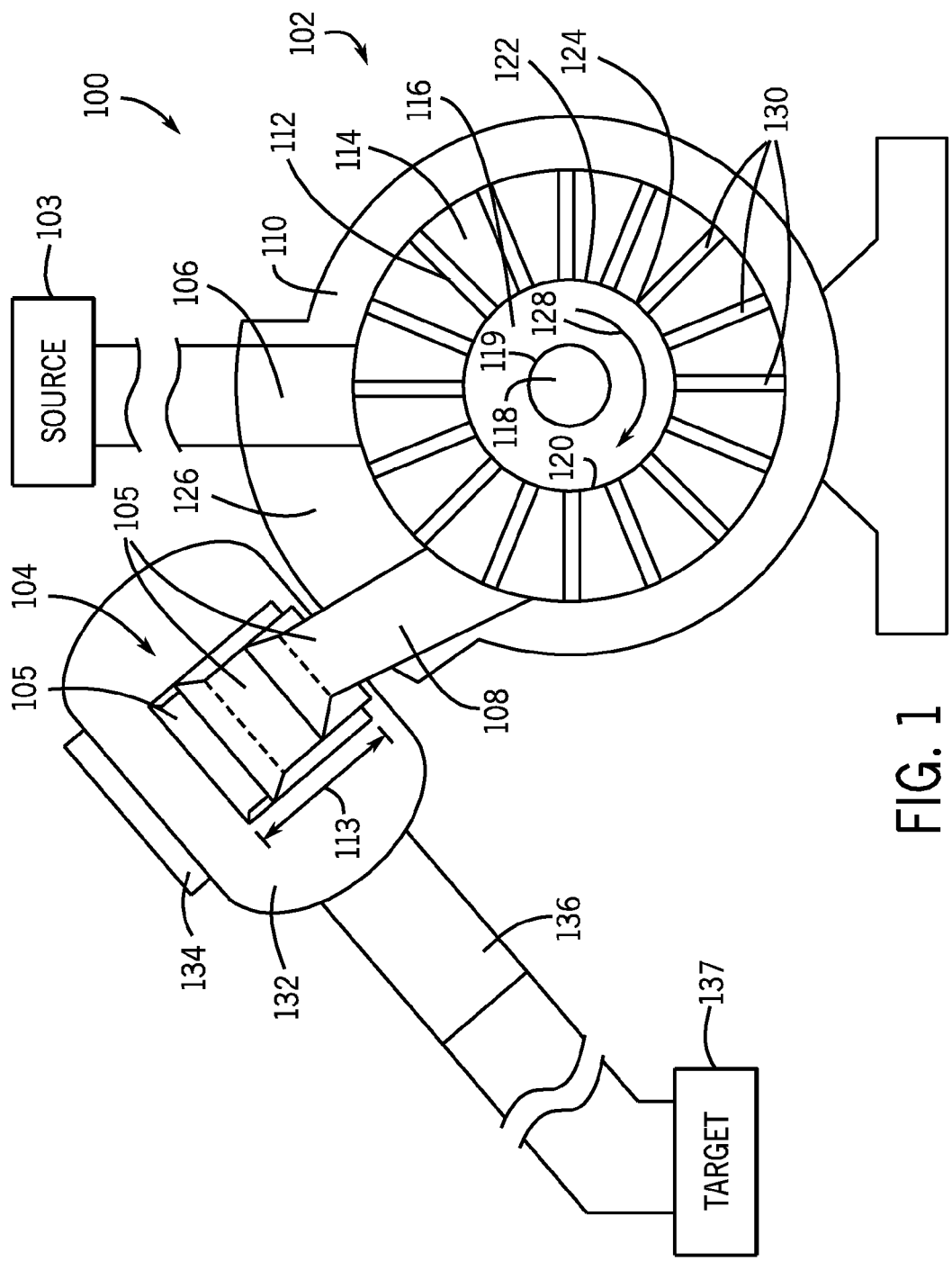
FIG. 1 is a cross-sectional view of an embodiment of a solids pressurizing feeder coupled to a variable length outlet pipe.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Within systems like an integrated gasification combined cycle (IGCC) power plant, a solids pressurizing feeder may be used to convey a mixture of solids (e.g., gasifier feedstock) and fluids (e.g., gases or liquids). For example, the solids may include a solid particulate fuel, such as coal, biomass, or other carbonaceous feedstock, which may be used in a gasifier, combustor, furnace, boiler, reactor, or any combination thereof. By further example, the fluid may include water, combustion gas, carbon dioxide, inert gas (e.g., nitrogen) and so forth. In such systems, the amount of force to convey the solids mixture through the solids pressurizing feeder varies depending on the chemical compositions, moisture content, compressibility, and other variables of the solids mixture. As the solids mixture moves from the inlet of the solids pressurizing feeder to the outlet, the mixture may be subject to forces that may compact the solids in the mixture to form a dynamic packed bed of solids. Once the solids reach the outlet of the solids pressurizing feeder, the forces that held them in the lockup condition begin to relax, and the solids are able to freely disengage from one another before being discharged. In some circumstances, system components of the solids pressurizing feeder may not be able to provide the amount of force needed to send the solids mixture from the inlet to the outlet. In such circumstances, components of the solids pressurizing feeder that contribute to the overall force needed to drive the solids mixture from the inlet to the outlet might need to be altered or replaced. For example, the outlet of the solids pressurizing feeder may be lengthened or shortened in order to increase or decrease the amount of force the outlet pipe contributes to the overall force needed to drive the solids mixture. However, it may be inefficient and difficult to replace the outlet pipe of the solids pressurizing feeder each time a longer or shorter pipe is needed. Furthermore, it may be costly to cease production each time the outlet pipe needs to be altered or replaced.

As discussed in further detail below, the disclosed embodiments provide systems and methods for conveying solids through a variable length outlet pipe of the solids pressurizing feeder. For example, in certain embodiments, the outlet pipe may have a plurality of pipe segments telescopically coupled to one another, such that a length of the outlet pipe is adjustable. Furthermore, the length of the outlet pipe may be altered by adjusting the pipe segments either manually by the operator, or automatically with an actuator system. As further explained below, the variable length outlet pipe may be lengthened to provide more driving force if the solids pressurizing feeder uses a greater amount of force to drive the solids mixture from the inlet of the feeder to the outlet. Likewise, the variable length outlet pipe may be shortened if there is too much force driving the solids mixture from the inlet of the feeder to the outlet.

FIG. 1 is a cross-sectional view of an embodiment of a system 100 having a solids pressurizing feeder 102 coupled to an outlet pipe 104, where the outlet pipe 104 has a length 113 that may be adjusted. As shown in FIG. 1, the solids pressurizing feeder 102 may be a rotary disk type solids pressurizing feeder, such as the Posimetric® Feeder made by General Electric Company of Schenectady, N.Y. The solids pressurizing feeder 102 may also be a double-track feeder type, a lock hopper feeder type, or any other type of solids pressurizing feeder. The solids pressuring feeder 102 includes a source 103, an inlet channel 106, an outlet channel 108, a pressure housing (or body) 110, and a rotor 112. The source 103 may be a feedstock supply system, a reactor, a waste collection unit, and so forth. The outlet channel 108 may be coupled to the outlet pipe 104 having a plurality of pipe segments 105 telescopically coupled to one another, such that the length 113 of the outlet pipe 104 is adjustable. The rotor 112 may include two substantially opposed and parallel rotary disks 114 separated by a hub 116 and joined to a shaft 118 that is common to the parallel rotary disks 114 and the hub 116. In FIG. 1, the two disks 114 are not in the plane of the page, as are the rest of the elements in the figure. One of the disks 114 is below the plane of the page, and the other disk 114 is above the plane. The disk 114 below the plane of the page is projected onto the plane of the page in order that it may be seen in relation to the rest of the components comprising the disk type solids pressurizing feeder 102. The outer convex surface 120 of the hub 116, the annularly shaped portion of the two disks 114 that extend between the outer surface of the hub 116 and the peripheral edge 122 of the disks 114, and the inner concave surface 124 of the pressure housing 110 define an annularly shaped rotating channel that connects the converging inlet channel 106 and the diverging outlet channel 108. A portion 126 of the pressure housing 110 that is disposed between the inlet channel 106 and the outlet channel 108 divides the rotating channel in such a way that solids entering the inlet channel 106 may travel only in the direction of rotation 128 of the rotor. Thus, solids may be carried from the inlet channel 106 to the outlet channel 108 by the rotating annularly shaped channel defined by the rotating outer surface of the hub 116, the rotating exposed annular surfaces of the disks 114, and the concave inner surface 124 of the pressure housing 110.

As solids enter and move downwards through the converging inlet channel 106, the particles are subject to compressive forces, and they progressively compact into a dynamic packed bed of particles. As the particles continue to be drawn downwards and into the rotating channel, the compaction may reach a point where the particles become interlocked and form a bridge across the entire cross-section of the channel. Generally, as the compacted particles continue to move through the rotating channel in the direction of rotation 128, a high pressure environment at the outlet channel 108 of the solids pressuring feeder 102 may dislodge the bridged particulates and release them beyond the exit of the outlet channel 108. However, when the force to dislodge the bridged particulates from the channel exceeds the force that can be generated by the high pressure environment at the outlet channel 108 of the solids pressuring feeder 102, a condition called "lockup" is created. When the condition of lockup is created, an additional force is needed to dislodge the bridged particulates from the outlet channel 108. In such instances, a drive motor 119 may provide torsional force through the shaft 118 to the bridged particulates so that the solids may be dislodged. In certain embodiments, the rotor disks 114 may have raised or depressed surface features 130 formed onto their surfaces. These features may allow the bridged particulates to achieve lockup in the rotating channel and may also improve the ability of the drive shaft 118 to transfer torque to the rotating solids so that they may be dislodged. In other embodiments, the driver motor 119 may not be sufficient to disengage the solid particulates because the amount of torque needed to drive the particles into the outlet channel 108 is greater than the amount of torque the drive motor 119 is able to provide.

When the amount of torque needed to disengage the solid particulates and drive the particles from the inlet channel 106 to the outlet channel 108 is greater than the amount of torque the driver motor 119 is able to provide, the solids pressurizing feeder 102 may be unable to convey solids properly. In such circumstances, the frictional force at the outlet channel 108 may be used to contribute to the overall torque, and may assist the drive motor 119 by providing additional torque for driving the particles into the outlet channel 108. The amount of frictional force provided by the outlet channel 108 to the overall torque depends on the length of the outlet channel 108. Furthermore, the amount of torque generally sufficient to dislodge the solid particulates in the solids pressurizing feeder 102 is not necessarily a constant variable, and may vary depending on the moisture content, compressibility, chemical construction, and composition of the solids entering into the inlet channel 106. However, it may be cumbersome and inefficient to replace the outlet channel 108 each time a different composition of, for example, coal and biomass, is introduced to the solids pressurizing feeder 102. As such, the outlet channel 108 having a variable length is generally more advantageous than if the outlet channel 108 were to have a predetermined fixed length.

In certain embodiments, the length of the outlet channel 108 may be altered by changing the length 113 of the outlet pipe 104 coupled to the outlet channel 108. The outlet pipe 104 may have a plurality of pipe segments 105 telescopically coupled to one another, such that the length 113 of the outlet pipe 104 may be adjusted to a desired length. For example, the outlet pipe 104 may have three pipe segments 105 arranged such that the outlet pipe 104 may expand (e.g., lengthen) or compress (e.g., shorten), resulting in an increased or decreased length 113, respectively. In certain embodiments, the pipe segments 105 may be generally rigid, and may be made from any material generally compatible with solids.

The outlet pipe 104 may be disposed within an outlet enclosure 132, which encloses the outlet pipe 104 as the outlet pipe 104 increases or decreases in length 113. As shown in FIG. 1, the outlet enclosure 132 may be coupled to the outlet channel 108. In other embodiments, the outlet enclosure 132 may be coupled to the pressure housing 110. The outlet enclosure 132 may have an opening 134 that may provide access for a user to manually adjust the pipe segments 105 to the desired length 113. The particles may move through the outlet pipe 104, into the outlet enclosure 132, and may be discharged through a discharge pipe 136 coupled to the outlet enclosure 132. The discharged particles may move downstream for further processing towards a target 137. The target 137 may be a gasifier, a combustor, a furnace, a boiler, a reactor, a gas treatment unit, a solids treatment unit, and so forth.

FIG. 2 is an axial cross-sectional view of an embodiment of the outlet pipe 104 having a plurality of telescopically expanded (e.g., lengthened) pipe segments 105. As shown in FIG. 2, the pipe outlet 104 may have three telescopically arranged pipe segments 105, such as a first pipe segment 138, a second pipe segment 142, and a third pipe segment 146. Increasing the length of the pipe segments 105 by arranging them in an expanded (e.g., lengthened) state may increase the amount of torque the outlet pipe 104 provides to the overall torque of the system. For example, a longer outlet pipe 104 may provide greater frictional force, and thus, may contribute a greater amount of overall torque to the system which in turn is used to dislodge compacted particles.

In other embodiments, the pipe outlet 104 may have 2, 3, 4, 5, 6, 7, 8, 9, 10, or more telescopically arranged pipe segments 105. Inner diameters 140, 144, and 148 of each of the pipe segment 138, 142, and 146 increase in size from an upstream end 150 of the pipe outlet 104 to a downstream end 152 of the pipe outlet 104. For example, the inner diameter 140 of the first pipe segment 138 is smaller than the inner diameter 144 of the second pipe segment 142. Likewise, the inner diameter 144 of the second pipe segment 142 is smaller than the inner diameter 148 of the third pipe segment 146. Furthermore, in certain embodiments, the inner diameter of a given pipe segment 105 may increase in size within the pipe segment 105 from an upstream end to a downstream end of the pipe segment 105. For example, the inner diameter 140 of the first pipe segment 138 may increase from the upstream end 150 to a downstream end 154 of the first pipe segment 138. This increase in inner diameter within a given pipe segment may result in a tapered edge 156 near the downstream end of the pipe segment. Likewise, a similar increase in the inner diameter 144 of the second pipe segment 142 may result in another tapered edge 156. The tapered edge 156 may provide a more uniform flow of solids between the pipe segments 138, 142, and 146, and may also increase the flow rate through the pipe outlet 104. In yet other embodiments, the inner diameter of a given pipe segment 105 remains approximately constant, without increasing or decreasing in size, from an upstream end to a downstream end of the pipe segment 105. For example, the inner diameter 148 of the third pipe segment 146 is approximately the same from an upstream end 158 to the downstream end 152 of the third pipe segment 146.

In certain embodiments, the plurality of pipe segments 105 may be secured to one another to prevent the outlet pipe 104 from separating or unfastening itself. Various securing devices may be used, such as, for example, set screws, bands, clamps, threaded connections, or other similar fasteners. In the illustrated embodiment, the third pipe segment 146 includes a set screw 160 configured to secure the third pipe segment 146 to the second pipe segment 142 when the set screw 160 is engaged with a slot 162 disposed on the outer surface 164 of the second pipe segment 142. As illustrated, with the set screw 160 positioned within the slot 162 closest to the downstream end 152, the pipe segments 142 and 146 are in a fully expanded and maximum length state. To reposition the pipe segments 142 and 146 for a different length, the set screw 160 may be removed from the slot 162, the pipe segments 142 and 146 may be repositioned to a second length, and the set screw 160 may then reengage with the slot 162 to secure the pipe segments 142 and 146 at the second length. Similarly, the second pipe segment 142 includes a set screw 166 configured to secure the second pipe segment 142 to the first pipe segment 138 when the set screw 166 is engaged with a slot 168 disposed on the outer surface 170 of the first pipe segment 138. As illustrated, with the set screw 166 positioned within the slot 168 closest to the downstream end 152, the pipe segments 138 and 142 are in a fully expanded and maximum length state. To reposition the pipe segments 138 and 142 for a different length, the set screw 166 may be removed from the slot 168, the pipe segments 138 and 142 may be repositioned to a second length, and the set screw 166 may then reengage with the slot 168 to secure the pipe segments 138 and 142 at the second length.

Although the tapered edges 156 of the pipe segments 138 and 142 promote a smooth and efficient flow of solids through the outlet pipe 104 and between the pipe segments 138, 142, and 146, some leakage between the segments 138, 142, and 146 may be possible. For example, the distance between the outer surface 170 of the first pipe segment 138, and the inner surface 172 of the second pipe segment 142 may be less than approximately 0.3 mm. To block leakage from the flow of solids into this area, an o-ring 174 may be disposed within a notch 176 recessed into the outer surface 170 of the first pipe segment 138. Alternatively or additionally, in other embodiments, the notch 176 may be recessed into the outer surface 172 of the second pipe segment 142. Similarly, an o-ring 174 may be disposed within a notch 176 recessed into the outer surface 164 of the second pipe segment 142. The o-rings 174 help seal the gap between a pair of pipe segments 105 without interfering with the securing and the repositioning of the pipe segments 105. The o-ring 174 may be made from a rubber, fabric, composite, metal, plastic, or other polymer compatible with the solids.

FIG. 3 is an axial cross-sectional view of an embodiment of the pipe outlet 104 of FIG. 2, having a plurality of telescopically compressed (e.g. shortened) pipe segments 105. As shown in FIG. 2, the pipe outlet 104 may have three fully expanded (e.g. lengthened) telescopically arranged pipe segments 138, 142, and 146. As illustrated in FIG. 3, the pipe outlet 104 may have three fully compressed telescopically arranged pipe segments 138, 142, and 146. Decreasing the length of the pipe segments 105 by arranging them in a compressed (e.g., shortened) state may decrease the amount of torque the outlet pipe 104 provides to the overall torque of the system. For example, a shorter outlet pipe 104 may provide less frictional force, and thus, may contribute a smaller amount of overall torque to the system which in turn is used to dislodge compacted particles. Having too much torque or too little torque within the system may hinder the solids pressurizing feeder 102 from conveying solids properly. In other embodiments, the pipe outlet 178 may have 2, 3, 4, 5, 6, 7, 8, 9, 10, or more telescopically arranged pipe segments 105 that expand or compress to create a variety of lengths.

The plurality of pipe segments 105 may be secured to one another to prevent the outlet pipe 104 from separating or unfastening itself. Various securing devices may be used, such as, for example, set screws, bands, clamps, threaded connections, or other similar fasteners. In the illustrated embodiment, the third pipe segment 146 includes the set screw 160 configured to secure the third pipe segment 146 with the second pipe segment 142 while engaged with the slot 162. The slot 162 is disposed on the outer surface 164 of the second pipe segment 142. In certain embodiments, several indentations 180 are disposed within the slot 162 to receive a bottom 165 of the set screw 160, and to further secure the pipe segment pairs from disengaging. The indentations 180 may be used to enable the outlet pipe 104 to be adjusted to only one of several pre-selected lengths. As illustrated, with the set screw 160 positioned within the slot 162 and inside the indentation 180 closest to the upstream end 150, the pipe segments 142 and 146 are in a fully compressed and minimum length state. To reposition the pipe segments for a different length, the set screw 160 may be removed from the slot 162 (i.e., the bottom 165 of the set screw 160 removed from the indentation 180), the pipe segments 142 and 146 may be repositioned to a second length, and the set screw 160 may then reengage with the slot 162 and the indentation 180 to secure the pipe segments 142 and 146 at the second length. Similarly, the second pipe segment 142 includes the set screw 166 configured to secure the second pipe segment 142 with the first pipe segment 138. The set screw 166 is engaged with the slot 168 disposed on the outer surface 170 of the first pipe segment 138. As illustrated, with the set screw 166 positioned within the slot 168 and inside the indentation 180 closest to the upstream end 150, the pipe segments 142 and 138 are in a fully compressed and minimum length state. To reposition the pipe segments for a different length, the set screw 166 may be removed from the slot 168 (i.e., the bottom 167 of the set screw 166 removed from the indentation 180), the pipe segments 138 and 142 may be repositioned to a second length, and the set screw 166 may then reengage with the slot 168 and the indentation 180 to secure the pipe segments 142 and 138 at the second length.

Figure 4:
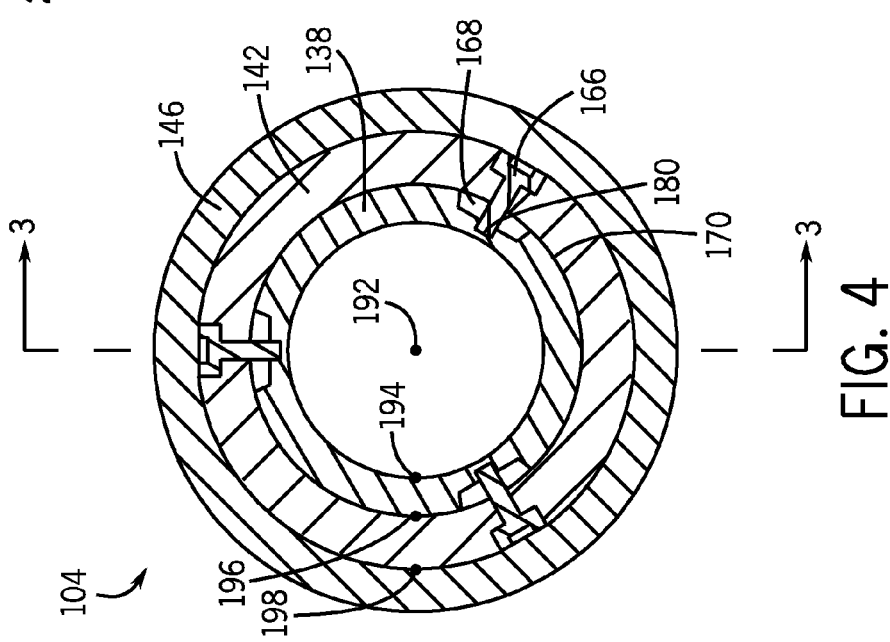
FIG. 4 is a radial cross-sectional view of an embodiment of a pipe outlet taken along line 4-4 of FIG. 3.

FIG. 4 is a radial cross-sectional view of the pipe outlet 104, taken along the line 4-4 of FIG. 3. Correspondingly, the axial cross-sectional view of FIG. 3 is indicated along the line labeled 3-3 in FIG. 4. The pipe outlet 104 may have a plurality of telescopically arranged pipe segments 105. As shown in FIG. 4, the pipe outlet 104 may have three telescopically arranged pipe segments 105, such as the first pipe segment 138, the second pipe segment 142, and the third pipe segment 146. In other embodiments, the pipe outlet 104 may have 2, 3, 4, 5, 6, 7, 8, 9, 10, or more telescopically arranged pipe segments 105. The inner diameter of the first, second, and third pipe segments 138, 142, and 146 increase in size, such that each pipe segment 105 may be concentrically arranged around one another. For example, the distance from an axial axis 192 to a first point 194 on the inner surface of the first pipe segment 138 is smaller than the distance from the axial axis 192 to a second point 196 on the inner surface of the second pipe segment 142. Likewise, the distance from the axial axis 192 to a second point 196 on the inner surface of the second pipe segment 142 is smaller than the distance from the axial axis 192 to a third point 198 on the inner surface of the third pipe segment 146.

The plurality of pipe segments 105 may be secured to one another to prevent the pipe segments of the outlet pipe 104 from separating or unfastening themselves. Various securing devices may be used, such as, for example, set screws, bands, clamps, threaded connections, or other similar fasteners. In certain embodiments, a combination of set screws 166 and slots 168 with indentations 180 may be used to secure the pipe segments of the outlet pipe 104. For example, the second pipe segment 142 includes the set screw 166 configured to secure the second pipe segment 142 with the first pipe segment 138. The set screw 166 is engaged with the slot 168 disposed on the outer surface 170 of the first pipe segment 138. The bottom of the set screw 166 engages with the indentation 180 disposed within the slot 168 to further secure the first pipe segment 138 with the second pipe segment 142. As shown in FIG. 4, three set screw 166 and slot 168 combinations spaced equidistant apart from one another may be used to secure the first and second pipe segment 138 and 142. In other embodiments, any number and/or arrangement of set screw 166 and slot 168 combinations may used to secure a pair of pipe segments 105 to one another.

Figure 5:
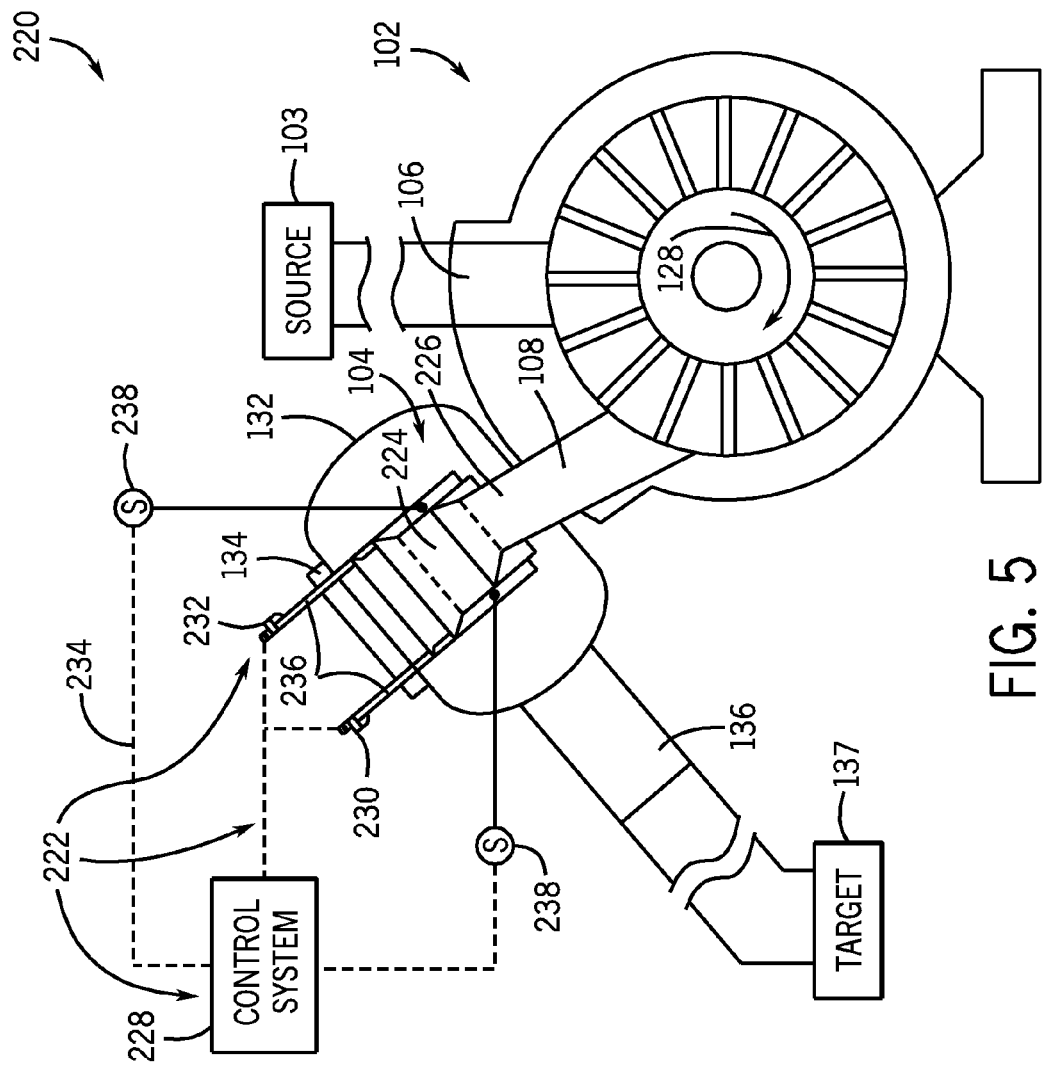
FIG. 5 is a cross-sectional view of an embodiment of a system having a solids pressurizing feeder coupled to a variable length outlet pipe and an actuator system.

FIG. 5 is a cross-sectional view of an embodiment of a system 220 having the solids pressurizing feeder 102 coupled to a variable length outlet pipe 104 and an actuator system 222. As particles move through the solids pressurizing feeder 102, they travel from the inlet channel 106 in the direction of the rotation 128 to the outlet channel 108. In certain embodiments, the outlet channel 108 may further be coupled to the outlet pipe 104 having a plurality of pipe segments 105 telescopically coupled to one another, such that the length 113 of the outlet pipe 104 is adjustable. For example, as illustrated, the outlet pipe 104 may have a first pipe segment 224 and a second pipe segment 226, where the two pipe segments are telescopically coupled together. In certain embodiments, the pipe outlet 104 may be enclosed in the outlet enclosure 132 having the opening 134 that could provide access for a user to manually adjust the pipe segments to a desired length and/or access components of the actuator system 222.

In yet other embodiments, the telescopically coupled pipe segments 224 and 226 of the outlet pipe 104 may be automatically adjusted using the actuator system 222, which may extend through the opening 134 in the outlet enclosure 132. The actuator system 222 may further be composed of a control system 228, a first actuator 230, and a second actuator 232. The control system 228 is responsive to signals 234 configured to control the first actuator 230 and the second actuator 232. The signals 234 may be configured to manually (e.g., based on operator input) and/or automatically control the first actuator 230 and the second actuator 232. The first actuator 230 may have an actuator rod 236 coupled to a first side of the second pipe segment 224, and may be configured to control the second pipe segment 224 by telescopically increasing or decreasing the length 113 of the pipe outlet 104. The actuator rod 236 is able to increase the length 113 of the outlet pipe 104 by moving the second pipe segment 224 away from the first pipe segment 226. Likewise, the actuator rod 236 is able to decrease the length 113 of the outlet pipe 104 by moving the second pipe segment 224 towards the first pipe segment 226. Similarly, the second actuator 232 may have another actuator rod 236 coupled to another side of the second pipe segment 224, and may be configured to control the second pipe segment 224 by telescopically increasing or decreasing the length 113 of the pipe outlet 104. In certain embodiments, the actuator rods 236 may pass through the opening 134 of the outlet enclosure 132. In such embodiments, a seal or a gasket may be disposed around the actuator rods 236 as they pass through the opening 134 in order to block leakage of the solids mixture to outside of the outlet enclosure 132. The first and second actuators 230 and 232 may be any suitable type of actuator. For example, the first and second actuators 230 and 232 may include electric motors, hydraulic drives, pneumatic drives, and so forth. Moreover, the first and second actuators 230 and 232 may be electrically, hydraulically, and/or pneumatically controlled by the control system 228.

In further embodiments, the actuator system 222 may include sensors 238 coupled to the control system 228 and configured to detect a suitable parameter for controlling the second pipe segment 224. For example, the sensors 238 may be configured to detect the amount of distance the second pipe segment 224 has been moved relative to the first pipe segment 226. The sensors 238 may be any suitable type of sensors, such as, for example, electrical sensors, optical sensors, mechanical sensors, and so forth. Moreover, the sensors 238 may be configured to detect operating conditions of the pipe outlet 104, such as the rate of solids flow from the outlet pipe 104 into the outlet enclosure 132, the rate of solids flow from the outlet enclosure 132 and through the discharge pipe 136, moisture content of the solids, compressibility of the solids, pressure, temperature, force, and so forth. The signals 234 are configured to receive data from the sensors 238, and may control the first and second actuators 230 and 232 based on the data from the sensors 238.

Technical effects of the invention include the coupling the outlet channel of the solids pressurizing feeder with the outlet pipe having a plurality of telescopically arranged pipe segments. The pipe segments are coupled to one another such that the outlet pipe may be expanded or compressed to a desired length. An outlet pipe with a variable length is more advantageous than an outlet pipe with a predetermined fixed length. A variable length may be able to contribute to the overall torque used to dislodge solid particulates that are in the compacted form within the solids pressurizing feeder. The solid particulates within the solids pressurizing feeder are generally dislodged so that solids moving through the feeder can be conveyed properly. With the ability to alter the length of the outlet pipe, processing efficiencies and cost reductions may be enabled since the outlet channel of the solids pressurizing feeder does not need to be replaced each time a different torque is needed from the feeder system. Further, the length of the outlet pipe may be altered by adjusting the pipe segments either manually by the operator, or automatically with an actuator system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a rotary solids pressurizing feeder having a rotary disk; and
an outlet pipe coupled to an outlet channel of the rotary solids pressurizing feeder, wherein the outlet pipe comprises a plurality of pipe segments telescopically coupled to one another such that a length of the outlet pipe is adjustable, and wherein the rotary solids pressurizing feeder feeds into a first segment of the plurality of pipe segments, and wherein a final segment of the plurality of pipe segments feeds into a discharge pipe.

2. The system of claim 1, wherein the rotary solids pressurizing feeder comprises at least one of a rotary disk type solids pressurizing feeder, a double-track feeder, or a lock hopper.

3. The system of claim 1, comprising an outlet enclosure coupled to the outlet channel of the rotary solids pressurizing feeder, wherein the outlet pipe is disposed in the outlet enclosure.

4. The system of claim 3, wherein the outlet enclosure is coupled to the discharge pipe.

5. The system of claim 3, wherein the outlet enclosure comprises an opening configured to provide access for adjustment of the length of the outlet pipe.

6. The system of claim 5, comprising an actuator assembly coupled to the outlet pipe and configured to adjust the length of the outlet pipe, wherein the actuator assembly comprises:
an actuator disposed outside of the outlet enclosure; and
a rod coupled to the actuator and configured to extend through the opening.

7. The system of claim 1, wherein each of the plurality of pipe segments has a different inner diameter.

8. The system of claim 7, wherein the plurality of pipe segments progressively increase in diameter from one segment to another.

9. The system of claim 7, wherein the inner diameter of at least one of the plurality of pipe segments increases from an upstream end of the pipe segment to a downstream end of the pipe segment.

10. The system of claim 1, comprising at least one equipment coupled to the rotary solids pressurizing feeder, wherein the at least one equipment comprises a feedstock supply system.

11. The system of claim 1, wherein the outlet pipe comprises a plurality of securing devices coupled to each of the plurality of pipe segments, and the plurality of securing devices are configured to secure each of the plurality of pipe segments with respect to one another.

12. The system of claim 1, wherein the outlet pipe comprises an o-ring between each of the plurality of pipe segments, and the o-ring is configured to block a flow of fluid between each of the plurality of pipe segments.

13. The system of claim 1, wherein each of the plurality of pipe segments comprise a slot configured to engage a movable fastener.

* * * * *